United States Patent [19]

Pärsson

[11] 4,004,142
[45] Jan. 18, 1977

[54] DEVICE FOR REGULATING THE ADJUSTMENT OF VEHICLE HEADLIGHTS

[75] Inventor: Nils Owe Pärsson, Trollhattan, Sweden

[73] Assignee: Saab-Scania Aktiebolag, Sodertalje, Sweden

[22] Filed: Sept. 23, 1974

[21] Appl. No.: 508,717

[30] Foreign Application Priority Data

Sept. 24, 1973 Sweden .............................. 7312947

[52] U.S. Cl. .......................... 240/7.1 LJ; 240/61.1
[51] Int. Cl.² ......................................... B60Q 1/10
[58] Field of Search ............ 240/7.1 LJ, 62.3, 61.1; 92/1

[56] References Cited

UNITED STATES PATENTS

| | | | |
|---|---|---|---|
| 3,316,397 | 4/1967 | Yssel | 240/7.1 LJ |
| 3,336,470 | 8/1967 | Sombardier | 240/7.1 LJ |
| 3,402,287 | 9/1968 | Hindman | 240/62.3 X |
| 3,453,424 | 7/1969 | Cibie | 240/7.1 LJ |
| 3,828,179 | 8/1974 | Straub | 240/62.3 X |

FOREIGN PATENTS OR APPLICATIONS 784,088   4/1968   Canada .................. 240/7.1 LJ

*Primary Examiner*—L. T. Hix
*Assistant Examiner*—Alan Mathews
*Attorney, Agent, or Firm*—Cushman, Darby & Cushman

[57] ABSTRACT

A device for regulating the adjustment of vehicle headlights in response to the vehicle load. The headlights are pivotally mounted in the vehicle body, and a relative movement between the vehicle body and the rear axle, caused by a load change is transferred to the headlights via a system of pipes and bellows containing a liquid.

2 Claims, 2 Drawing Figures

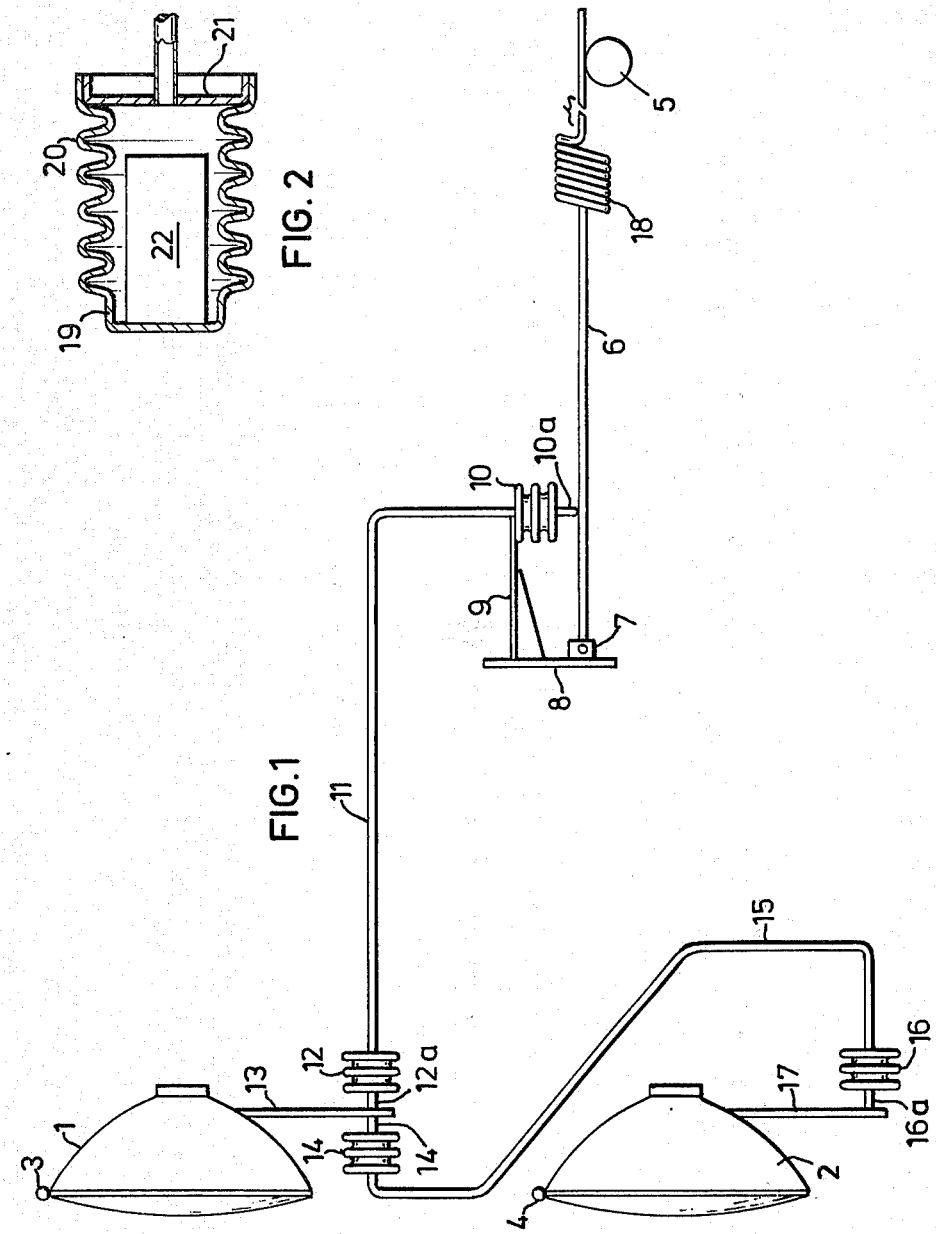

DEVICE FOR REGULATING THE ADJUSTMENT OF VEHICLE HEADLIGHTS

The present invention relates to a device for automatically regulating the adjustment of headlights in motor vehicles, in response to the load on the vehicle, comprising a first sensing element fixedly arranged on the vehicle for sensing the position of the vehicle body relative to the means carrying the rear wheels of the vehicle, a first actuating element for a first headlight, the adjustment of which is to be regulated by pivotal movements of the headlights about fixed shafts, a first pipe which connects said first sensing means with said first actuating element so that a first closed system is formed, a second sensing element arranged to sense the movements initiated by the first actuating element, a second actuating element for a second headlight, and a second pipe which connects said second sensing element with said second actuating element so that a second closed system is formed, the said first and second closed systems being filled with a liquid for transmitting movement between respective sensing and actuating elements for the regulation of the adjustment of the first and the second headlight respectively.

Devices of the above mentioned kind are already known, but it has been found that these known devices have disadvantages which make them unsuitable in practice. As a rule they are alltogether too complicated, which causes them to be expensive in manufacture and mounting. The number of ingoing details also makes the risk for malfunctions comparatively large. Another disadvantage is that it is practically impossible to avoid reaction by such a device even for normal springing movements of the vehicle. When the vehicle is driven on an uneven surface, this results in the headlights carrying out adjustment movements which do not agree with the position of the vehicle in relation to the surface for the prevailing load.

The object of the present invention is to eliminate the above-mentioned disadvantages, and to provide a device of the kind mentioned in the introduction, containing simple and cheap components which in all conditions give satisfactory operation in regulating the adjustment of the headlights in response to the load on the vehicle. This is accomplished by giving the device the distinguishing features to be seen from the following claims.

The invention will now be described more closely below while referring to the attached drawing of an embodiment of a device according to the invention, on which drawing FIG. 1 is a schematic view illustrating the principle construction of the device, and FIG. 2 shows a bellows incorporated in the device according to FIG. 1.

The device according to the invention is intended to regulate the adjustment of two headlights 1 and 2 on the vehicle in response to the load on the vehicle. Alteration of the load causes alterations in the position of the vehicle chassis in relation to the surface travelled upon. This also means that the vehicle chassis alters position in relation to the rear axle 5 of the vehicle, and to means connected thereto. These unavoidable positional alterations are utilized in the device according to the invention to compensate and regulate the adjustment of the headlights for avoiding a dazzling effect on approaching vehicles. To this end the headlights 1, 2 are so mounted on the vehicle that they can each be turned about a horizontal shaft 3 and 4 respectively, rigidly mounted on the vehicle. For positional regulation of the headlights 1, 2 an arm 6 is arranged between the rear axle 5 and a fixed point on the vehicle body. One end of the arm 6 is pivotably suspended in a support 7 which is attached to the vehicle body, a portion of which is designated by 8 in FIG. 1. When the mutual position between the body 8 and rear axle 5 is altered, the arm 6, the free end of which is suitably abutting the upper side of the rear axle 5 will turn about the support 7.

As is shown in FIG. 1 a bracket 9 is also attached to the body portion 8. The bracket 9 carries a sensing element in the shape of a flexible bellows 10 which is suitably made of metal, and at one end is attached to the support 9 and at the other end is provided with a pin 10a abutting the arm 6. Pivotal movements of the arm 6 are thus transferred via the pin 10a to actuate the bellows 10 so that its volume is altered.

The bellows 10 is at its attached end connected by a pipe 11 to an actuating means in the shape of a flexible bellows 12 adjacent to the headlights 1, 2 of the vehicle. The bellows 10 and 12 and the pipe 11 thereby form a closed system which is filled with an operating medium for transferring the movements of the bellows 10 to the bellows 12. The medium suitably consists of a liquid but even a gas may be used. An alteration of the volume of the bellows 10 is intended to result in a corresponding alteration of the volume of bellows 12. In consideration of this, the bellows 12 is, at the end which is connected to the pipe 11, attached to the vehicle (not shown), and at its free end the bellows 12 engages, by means of a pin 12a mounted on the bellows, a vertical arm 13. The arm is attached to the headlight 1, and the movements of the bellows 12 on alteration in volume are thus transferred via the pin 12a and the arm 13 into pivotal movements of the headlight 1 about the horizontal shaft 3.

The headlight 2 is arranged to be pivoted about the horizontal shaft 4 in response to movements of the arm 13. A second sensing element in the shape of a flexible bellows 14 is at its one end attached to the vehicle (not shown) and the bellows 14 is arranged to sense movements of the arm 13 by means of a pin 14a mounted on the free end of the bellows. The bellows 14 is connected via a pipe 15 with a second actuating element in the shape of a bellows 16. The bellows 14, 16 and the pipe 15 thereby form a closed system, which is filled with a medium, suitably the same kind of medium as in the closed system 10, 11, 12. The bellows 16 is at one end attached to the vehicle (not shown), and with a pin 16a mounted at its free end the bellows 16 engages a vertical arm 17, which is attached to the headlight 2. Movements of the bellows 16 on volume alterations are thereby transferred via the pin 16a and the arm 17 into pivotal movements of the headlight 2.

By suitable dimensioning of the ingoing components, the headlights 1, 2 can be pivoted to such an extent that their headlamp adjustments are compensated for the positional alterations of the vehicle chassis in relation to the surface travelled upon and the rear axle 5 arising due to load changes.

In order to prevent the bellows 10 or the pipe 11 from being ruptured at severe movements of the rear axle 5, for example when driving on an uneven surface, the arm 6 is suitably made to yield elastically at such movements. For this purpose a portion of the arm 6 exemplified in FIG. 1 is made as a tightly wound helical spring 18 which remains stiff during normal movements, but which bends at sudden movements and thereby protects the bellows 10 against too great loads.

In FIG. 2 is shown a longitudinal section of a bellows 19, which is suitable for use as a standardised unit for the bellows 10, 12, 14 and 16 in the device according to FIG. 1. According to the more detailed illustration in FIG. 2, the bellows 19 comprises a corrugated mantle 20, to which is attached a bottom 21 provided with a connection for a pipe. Inside the closed bellows 19 there is a filler body 22 arranged to reduce the volume of liquid contained in the bellows. This allows the volume alterations dependent on temperature in the liquid to be reduced, the whole device thus being more independent of ambient temperature.

To prevent normal springing movements, occurring when the vehicle is driven, from being transferred into movements regulating the adjustment of the headlights 1, 2, the device according to the invention is equipped with means which oppose volume alterations in the closed systems at temporary position alterations between the rear axle and the vehicle chassis 8. Such means may be designed in a plurality of ways, but in a preferred embodiment a restriction (not shown) has been arranged in the pipe 11 to the first actuating element 10.

The invention is not limited to the embodiment described above, but alterations can be made within the scope of the claims.

What I claim is:

1. A device for automatically regulating the adjustment of headlights in motor vehicles in response to the load on the vehicle, comprising a first sensing means fixedly arranged on the vehicle for sensing the position of the vehicle body relative to means carrying rear wheels of the vehicle, a first actuating element for a first headlight, a first pipe which connects said first sensing means with said first actuating element so that a first closed system is formed, a second sensing means arranged to sense the movements initiated by the first actuating element, a second actuating element for a second headlight, and a second pipe which connects said second sensing element with said second actuating element so that a second closed system is formed, the said first and second closed systems being filled with a liquid for transmitting movement between respective sensing means and actuating elements for the regulation of the adjustment of the first and the second headlights respectively, said adjustments being regulated by pivotal movements of the headlights about fixed shafts, the first sensing means engages with an arm having one end pivotally connected to the vehicle body, and its other end arranged to move together with the rear axle of the vehicle, a portion of the arm is a closely wound helical spring with its central axis extending in the longitudinal direction of the arm, thereby making said arm flexible so as to prevent rear axle springing movements being transferred into movements regulating the adjustment of the headlights when the vehicle is driven.

2. A device as claimed in claim 1, wherein the spring portion of the arm is situated at a point between the rear axle of the vehicle and the point where the first sensing means engages with the arm.

* * * * *